(12) United States Patent
Couch et al.

(10) Patent No.: US 9,436,622 B2
(45) Date of Patent: Sep. 6, 2016

(54) BROADCASTING COMMUNICATIONS OVER AN ADVERTISING CHANNEL

(71) Applicant: INTEL CORPORATION, Santa Clara, CA (US)

(72) Inventors: Kelly J. Couch, Beaverton, OR (US); Daniel K. Osawa, Beaverton, OR (US)

(73) Assignee: INTEL CORPORATION, Santa Clara, CA (US)

( * ) Notice: Subject to any disclaimer, the term of this patent is extended or adjusted under 35 U.S.C. 154(b) by 41 days.

(21) Appl. No.: 14/103,744

(22) Filed: Dec. 11, 2013

(65) Prior Publication Data

US 2015/0161061 A1 Jun. 11, 2015

(51) Int. Cl.
| | |
|---|---|
| *G06F 3/00* | (2006.01) |
| *G06F 13/12* | (2006.01) |
| *G06F 13/38* | (2006.01) |
| *G06F 1/32* | (2006.01) |

(52) U.S. Cl.
CPC ............ *G06F 13/12* (2013.01); *G06F 1/3206* (2013.01); *G06F 1/3209* (2013.01); *G06F 1/3231* (2013.01); *G06F 13/385* (2013.01); *Y02B 60/1228* (2013.01); *Y02B 60/1235* (2013.01)

(58) Field of Classification Search
CPC ...................................................... G06F 1/324
See application file for complete search history.

(56) References Cited

U.S. PATENT DOCUMENTS

| | | | |
|---|---|---|---|
| 7,409,567 B2* | 8/2008 | Hammes et al. ............ 713/320 |
| 2007/0141988 A1 | 6/2007 | Kuehnel et al. | |
| 2010/0052870 A1 | 3/2010 | King | |
| 2011/0055886 A1* | 3/2011 | Bennett et al. ............... 725/116 |
| 2012/0297440 A1 | 11/2012 | Reams et al. | |
| 2013/0212270 A1 | 8/2013 | Hsieh et al. | |
| 2014/0157135 A1* | 6/2014 | Lee et al. ...................... 715/738 |
| 2014/0223164 A1* | 8/2014 | Jiang ..................... G06F 9/4418 713/100 |
| 2014/0266634 A1 | 9/2014 | Castillo et al. | |
| 2014/0273844 A1 | 9/2014 | Castillo et al. | |

OTHER PUBLICATIONS

United States Patent and Trademark Office; Office Action for U.S. Appl. No. 13/802,352 dated Sep. 22, 2014; 44 pages.
United States Patent and Trademark Office; Office Action for U.S. Appl. No. 13/931,126 dated Sep. 22, 2014; 37 pages.

* cited by examiner

*Primary Examiner* — Henry Tsai
*Assistant Examiner* — Juanito Borromeo
(74) *Attorney, Agent, or Firm* — Schwabe, Williamson & Wyatt, P.C.

(57) ABSTRACT

Apparatuses, methods and storage media for communications between a peripheral device and host device in the absence of established connection between the devices are described. In one instance, an apparatus may include a host processor, a memory, and a controller coupled with the host processor and the memory and configured to detect for a communication broadcasted via an advertising channel by a peripheral device; determine whether a unique identifier previously communicated to the peripheral device is present in the detected communication; and provide a message corresponding to the communication to the host processor for processing, based on a result of the determination. The apparatus communicates with the peripheral device via a connection established over communication channels. The advertising channel and the communication channels are different. The connection between the devices is not established when the communication is broadcasted via the advertising channel. Other embodiments may be described and claimed.

23 Claims, 6 Drawing Sheets

BROADCASTING COMMUNICATIONS OVER AN ADVERTISING CHANNEL

TECHNICAL FIELD

The present disclosure relates to the field of communications, in particular, to apparatuses, methods and storage media associated with communication broadcasts in low energy communication networks.

BACKGROUND

The background description provided herein is for the purpose of generally presenting the context of the disclosure. Unless otherwise indicated herein, the materials described in this section are not prior art to the claims in this application and are not admitted to be prior art by inclusion in this section.

Communications in low energy wireless computer network technologies such as Bluetooth Low Energy (BLE) or ZigBee® are connection-based and are operated according to connection protocols developed for communication control. Typically, any low energy data communications between a master device (e.g., host computer or media device) and a peripheral device (e.g., mouse or remote control device respectively) require establishing a connection between these devices according to adapted connection protocols. However, establishing a connection between devices in each communication instance may cause delays in communications and may result in excessive overhead, such as drawing additional power from the device power source (e.g., battery) each time the connection is established.

BRIEF DESCRIPTION OF THE DRAWINGS

Embodiments will be readily understood by the following detailed description in conjunction with the accompanying drawings. To facilitate this description, like reference numerals designate like structural elements. Embodiments are illustrated by way of example, and not by way of limitation, in the Figures of the accompanying drawings.

DETAILED DESCRIPTION

Figure 1:
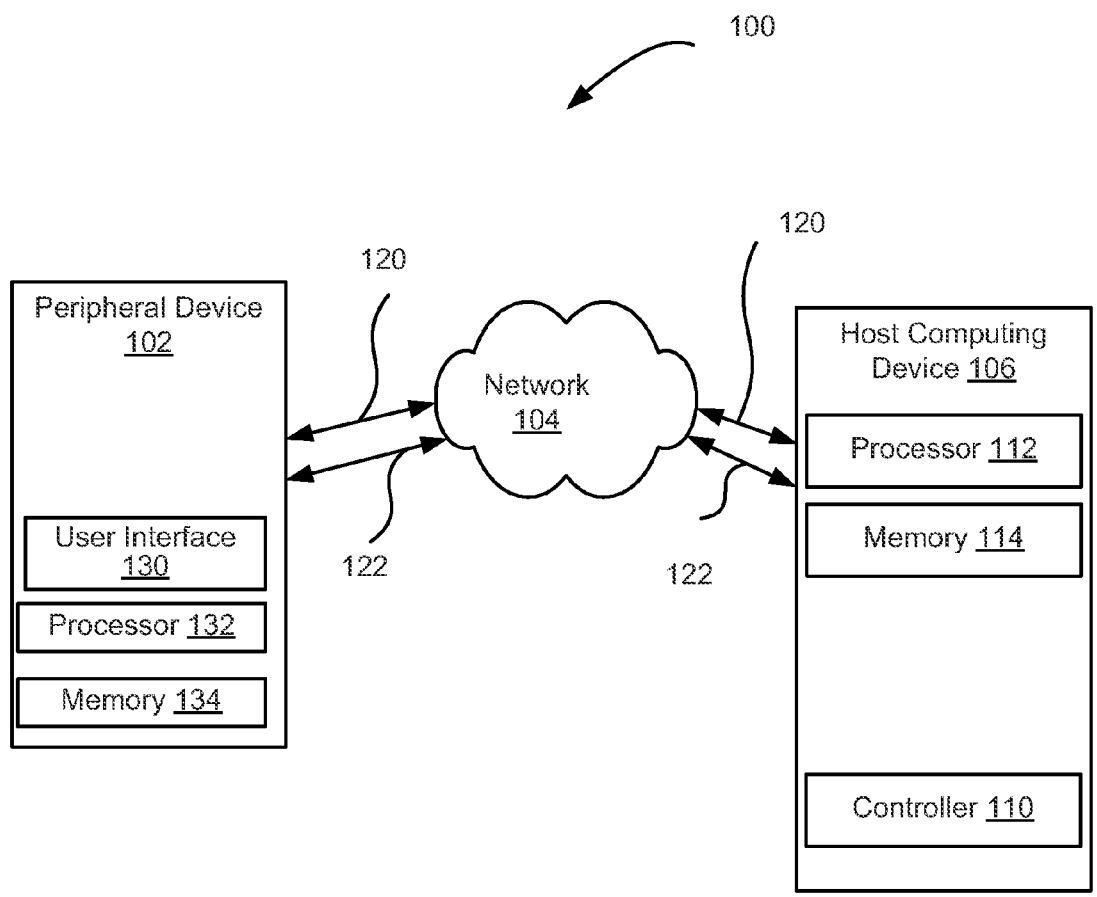
FIG. 1 is a block diagram illustrating an example computer system configured to enable communication between devices in a wireless network without established connection, in accordance with some embodiments.

In the following detailed description, reference is made to the accompanying drawings which form a part hereof wherein like numerals designate like parts throughout, and in which is shown by way of illustration embodiments that may be practiced. It is to be understood that other embodiments may be utilized and structural or logical changes may be made without departing from the scope of the present disclosure. Therefore, the following detailed description is not to be taken in a limiting sense, and the scope of embodiments is defined by the appended claims and their equivalents.

Apparatuses, methods and storage media for communications between a peripheral device and host device in the absence of established connection between the devices are described herein. In one instance, an apparatus may comprise a host device, including a host processor, a memory, and a controller coupled with the host processor and the memory. The controller may be configured to detect a communication broadcasted via an advertising channel by a peripheral device, determine whether a unique identifier previously communicated to the peripheral device is present in the detected communication, and provide a message corresponding to the communication to the host processor for processing, based on a result of the determination. The host device may communicate with the peripheral device via a connection established over allocated communication channels. The advertising channel may not be included in the communication channels and may be configured to communicate peripheral device availability, presence, identification, and other communication parameters to the host device. The connection between the devices over communication channels may not be established when the communication is broadcasted via the advertising channel.

Various operations may be described as multiple discrete actions or operations in turn, in a manner that is most helpful in understanding the claimed subject matter. However, the order of description should not be construed as to imply that these operations are necessarily order dependent. In particular, these operations may not be performed in the order of presentation. Operations described may be performed in a different order than the described embodiment. Various additional operations may be performed and/or described operations may be omitted in additional embodiments.

For the purposes of the present disclosure, the phrase "A and/or B" means (A), (B), or (A and B). For the purposes of the present disclosure, the phrase "A, B, and/or C" means (A), (B), (C), (A and B), (A and C), (B and C), or (A, B and C).

The description may use the phrases "in an embodiment," or "in embodiments," which may each refer to one or more of the same or different embodiments. Furthermore, the terms "comprising," "including," "having," and the like, as used with respect to embodiments of the present disclosure, are synonymous.

As used herein, the term "logic" and "module" may refer to, be part of, or include an Application Specific Integrated Circuit (ASIC), an electronic circuit, a processor (shared, dedicated, or group) and/or memory (shared, dedicated, or group) that execute one or more software or firmware programs, a combinational logic circuit, and/or other suitable components that provide the described functionality.

FIG. 1 is a block diagram illustrating an example computer system 100 configured to enable communication between devices in a wireless network without established connection, in accordance with various embodiments. The computer system 100 may include a peripheral device 102 (also known as slave device) configured to communicate with a host computing device 106 (also known as a master device) via one or more channels 120, 122 allocated for communication over a network 104.

The network 104 may include any appropriate network, including an intranet, the Internet, a cellular network, a local area network, a personal network, a wide area network, any portion of which is wired or wireless (e.g., near field communication (NFC) or Wi-Fi,) or any other such network or combination thereof. Protocols and components for communicating via such a network are well known and will not be discussed herein in detail. In some embodiments, the network 104 may include a low energy wireless communication network, such as Bluetooth®, Bluetooth® Low Energy (BLE), ZigBee®, ANT wireless network, or other low energy wireless network.

The peripheral device 102 may include any device configured to communicate with the respective host device 106 via the network 104 (e.g., low energy wireless network). For example, the peripheral device 102 may include a remote control device for a media device (e.g., a set-top box, game console, media player, tablet computer, or the like), a sensor device configured to communicate with a receiving device, a wireless mouse for a computing device, a speaker phone or headset for a mobile or stationary telephone device, a gaming controller, keyboard, or another similar user input device. Accordingly, the host device 106 may include any device configured to communicate with the respective peripheral device, such as a telephone, tablet PC, media player, video or computer game, a modem, and the like.

In more general terms, the host device 106 and peripheral device 102 may include any computing device having processors 112 and 132 and memories 114 and 134 respectively. The processors 112 and 132 may include any type of processor, such as a central processing unit (CPU), a microprocessor, and the like. The processors 112 and 132 may be implemented as an integrated circuit, e.g., multi-core processor, for example.

The memories 114 and 134 may be temporal and/or persistent storage of any type, including, but are not limited to, volatile and non-volatile memory, optical, magnetic and/or solid state mass storage, and so forth. Volatile memory may include, but are not limited to, static and/or dynamic random access memory. Non-volatile memory may include, but are not limited to, electrically erasable programmable read-only memory, phase change memory, resistive memory, and so forth. The structure of the host device 106 and peripheral device 102 will be described in greater detail in reference to FIGS. 5-6.

In some embodiments, such as in a low energy network environment, communications between the peripheral device 102 and host device 106 may occur via one or more communication channels, for example, communication channels 120, according to a communication protocol adapted for the network. Such communications may be managed, at least in part, by a controller 110 associated with (e.g., residing on) the host device 106. The controller 110 may be implemented as a standalone module interfacing with the peripheral device 102. The controller 110 may comprise hardware, software, firmware, or a combination thereof and may be configured to execute instructions related to communications between devices 102 and 106 according to the communication protocol.

In some embodiments, a communication protocol may comprise a protocol stack that may be split into two portions. The controller 110 may be configured to handle one portion, such as the protocol layers defining timing-critical communication components (e.g., link layers, physical layers, radio interface, etc.), while the host device 106 may be configured to handle another portion, e.g., higher protocol levels, such as communications operating system, control logic, security, transport, attribute profile, and the like.

Communications between the peripheral device 102 and host device 106 may occur via allocated channels 120, 122, over a bandwidth allocated for such communication, according to the communication protocol. The channels 120, 122 may be split into one or more advertising channels 120 and one or more communication channels 122, each channel having a corresponding bandwidth allocated for the channel. The advertising channels 120 may be configured for broadcasting peripheral device 102's presence or availability for connecting or reconnecting with the host device 106, and generally other information related to establishing connection between devices 102 and 106. The communication channels 122 may be dedicated to data transmissions between devices 102 and 106 during the established connection.

In operation, the peripheral device 102 may be configured to announce its presence to the host device 106, by broadcasting a token, such as device identifier recognizable by the host device, via the advertising channel 120. If the host device 106 recognizes the peripheral device, the host device may proceed to establish a connection with the peripheral device 102. Establishing the connection may require one or more "handshake" procedures, such as device 102 authentication with the host device 106, setting communication parameters, and so on. After the connection between devices 102 and 106 has been established, communications between devices 102 and 106 may occur via dedicated communication channel(s) 122. Communications may include data transmissions from the peripheral device 102 to the host device 106 that may include information (asynchronous data) related to different events initiated by the peripheral device. Such events may include, for example, user input, such as pressing buttons or keys, moving joysticks, mouse clicking or moving the mouse, selecting selectable user interface elements, or other interactions of a user with a user interface 130 of the peripheral device 102.

If a connection between devices 102 and 106 is established as described above, there may occur idle periods during which no communications between devices 102 and 106 take place. If the idle period persists over a predetermined period of time, the host device 106 may exit a normal mode of operation (e.g., power-on state) and enter a power-off or power-saving (e.g., low-power) mode of operation, during which the host device 106 may be unavailable to the peripheral device 102.

For example, the controller 110 may be configured to maintain the established connection between devices 102 and 106 during the host device 106's power-off or power-saving state. For example, the controller 110 may be configured to detect a communication from the peripheral device 102. Because the controller 110 typically may not be configured to determine what type of communication has been transmitted (e.g., event-related information, connection state-change information, and the like), the controller 110 may be configured to request or command the host device 106 to "wake up," e.g., to re-enter into a power-on state in order to process the received communication. Accordingly, in the host device 106's power-off or power-saving state, the controller 110 may "wake up" the host device 106 every time a communication from the peripheral device 102 is received.

In some embodiments, the controller 110 may be further configured, in the absence of the established connection between devices 102 and 106, to enter a scanning mode of operation upon the host device 106's powering-off or going into a power-saving state, e.g., in response to receiving an indication from the host device 106 that the host device 106 has entered or about to a power-saving or power-off state. In the scanning mode, the controller may scan the advertising channels 120 for communication broadcasts initiated by the peripheral device 102. The controller 110 may be informed of, e.g., receive from the host device 110, a unique identifier (e.g., a data string or data packet) that the controller 110 may be able to recognize in the peripheral device 102's communication broadcast. The controller 110 may be configured to detect a communication broadcasted via the advertising channel 120 by the peripheral device 102, determine whether the unique identifier is present in the detected communication, and communicate a command or request to the host device 106 to resume a power-on state, based on a result of the determination (e.g., upon determining the presence of the unique identifier in the communication).

Accordingly, in the absence of the established connection between devices 102 and 106 as described above, the host device 102 may wake up only in response to a communication of a particular kind, e.g., having a unique identifier set by the host device 106 and recognized by the controller 110. The unique identifier may be pre-defined and communicated to the controller 110 and the peripheral device 102 by the host device 106 ahead of entering the power-saving or power-off state. For example, the unique identifier may be programmed into the host device 106, controller 110, and peripheral device 102.

By way of another example, an established connection between devices 102 and 106 may be interrupted or dropped, e.g., after a pre-determined time period of idle connection. A communication initiated by the peripheral device 102, such as transmitting data about an event (e.g., user input) may require re-establishing the connection between the devices 102 and 106. Note that the user input-related events may occur asynchronously and/or spuriously, and the pre-determined time period for established connection between the devices 102 and 106 may elapse between two asynchronous events. As described above, reconnecting the devices 102 and 106 may require a broadcast of device 102's availability and requisite "handshake" exchange, resulting in providing a communication channel or channels 122 for transmitting the communication to the host device 106.

In some embodiments, in the absence of the established connection between the devices 102 and 106, the peripheral device 102 may be configured to transmit a communication with event information to the host device 106 via the advertising channel(s) 120. The communication may include a unique identifier (a data string, a data packet, etc.). In some embodiments, the unique identifier may be previously set by the host device 106 and communicated to the device 102 and controller 110. In other embodiments, the peripheral device 102, the controller 110, and the host device 106 may be programmed with the unique identifier. For example, a product family of the host device 106 may use the same unique identifier. In this way, any peripheral device associated with the product family may be configured to work with any master device (e.g., host device 106) of that product family.

The device 102 may be configured to insert the unique identifier in the data associated with user input-related events, for example, to be transmitted to the host device 106. The controller 110 may be configured to recognize the unique identifier in the communications broadcasted over the advertising channel(s) 120 in the absence of the established connection between devices 102 and 106. The unique identifier may indicate, for example, that the communication associated with the unique identifier includes data about an event associated with the peripheral device 102.

The controller 110 may be configured to initiate a scanning of the advertising channel(s) 120 for the communications initiated by the peripheral device 106 when the connection between the computing device and the peripheral device is not established. The controller 110 may be further configured, in the absence of the established connection between devices 102 and 106, to detect a communication broadcasted via the advertising channel 120 by the peripheral device 102, determine whether the unique identifier previously communicated to the peripheral device 102 is present in the detected communication, and communicate the detected event data to the host device 106 for processing and execution, based on a result of the determination (e.g., upon determining the presence of the unique identifier in the communication).

Accordingly, the system 100 may be configured to enable a provision of the event-related communications from the peripheral device 102 to the host device 106 without requiring an established and maintained connection between devices 102 and 106. When there is an established connection between devices 102 and 106, the peripheral device 102 may transmit the communication to the host device over a communication channel 122, according to the communication protocol.

Figure 2:
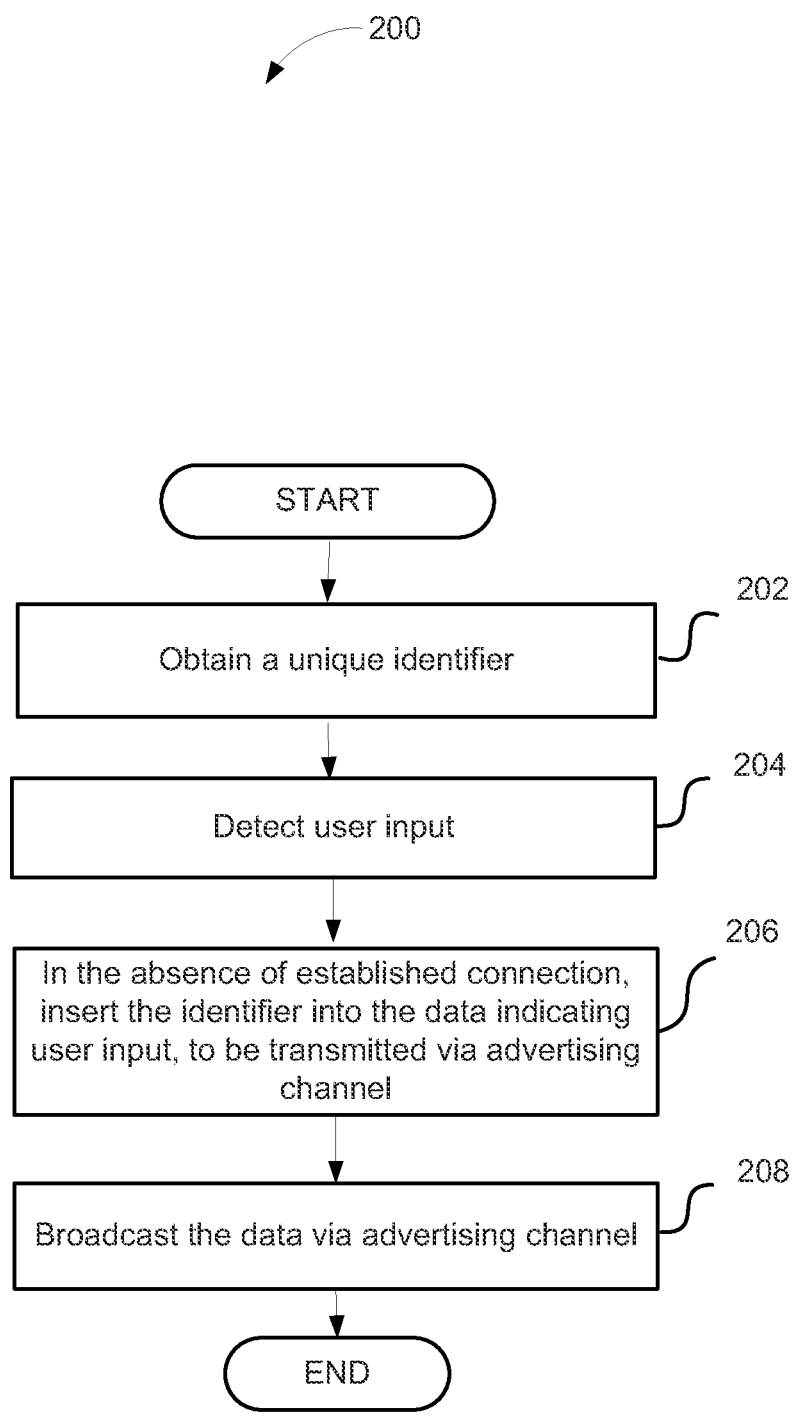
FIG. 2 is a process flow diagram illustrating a process for communications between a peripheral device and a host device in the absence of established connection between the devices, in accordance with some embodiments.

FIG. 2 illustrates a process 200 for communications between a peripheral device and a host device in the absence of established connection between the devices, in accordance with some embodiments. The process 200 may be performed, for example, by the peripheral device 102 of the computer system 100, described in reference to FIG. 1.

The process 200 may begin at block 202, where the peripheral device 102 may obtain a unique identifier to be used in communications with the host device 106 in the absence of the established connection between devices 102 and 106, for broadcasting the communications over an advertising channel (e.g., channel 120). As described above, the unique identifier may be previously set by the host device 106 and communicated to the device 102 and controller 110. In other embodiments, the peripheral device 102, the controller 110, and the host device 106 may be programmed with the unique identifier.

At block 204, the peripheral device 102 may detect user input, such as pressing buttons or keys, moving joysticks, mouse clicking or moving the mouse, selecting selectable user interface elements, or other interactions of a user with a user interface 130 of the peripheral device 102.

At block 206, the peripheral device 102, in the absence of established connection between devices 102 and 106, may insert the identifier into the data indicating user input, to be transmitted via an advertising channel. At block 208, the peripheral device 102 may initiate broadcasting a communication containing the event data and unique identifier, via the advertising channel 120, to be detected by the controller 110, as described in reference to FIGS. 3 and 4.

Figure 3:
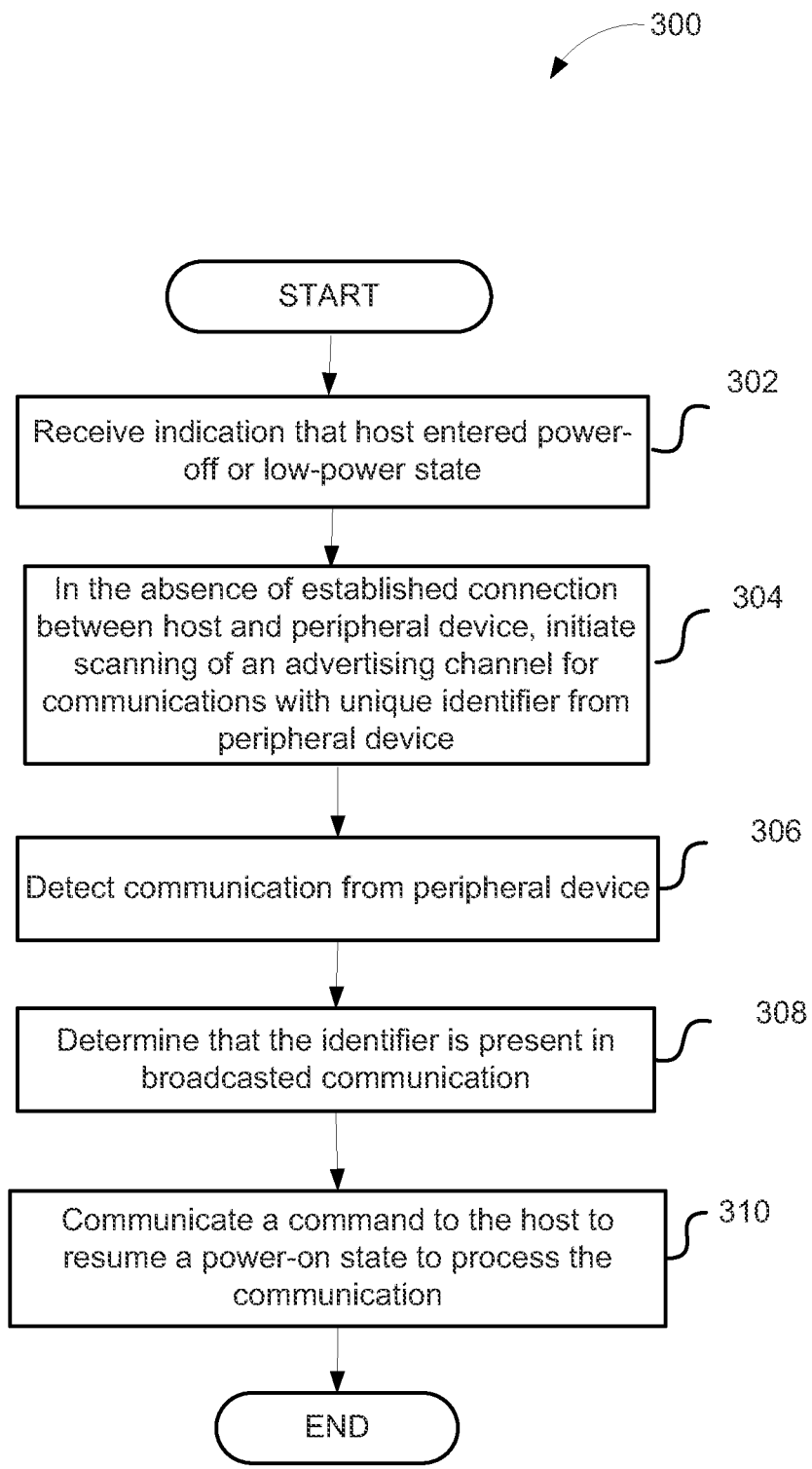
FIG. 3 is a process flow diagram illustrating another process for communications between a peripheral device and a host device in the absence of established connection between the devices, in accordance with some embodiments.

FIG. 3 is a process flow diagram illustrating a process 300 for communications between a peripheral device and a host device in the absence of established connection between the devices, in accordance with some embodiments. The process 200 may be performed, for example, by the controller 110 of the computer system 100, described in reference to FIG. 1.

The process 300 may begin at block 302, where the controller 110 may receive indication, e.g., from the host device 106, that the host device 106 entered power-off or power-saving state. At block 304, the controller 110 may, in the absence of established connection between host device 106 and peripheral device 102, initiate scanning of an advertising channel for communications with unique identifier that may be initiated by the peripheral device 102.

At block 306, the controller 110 may detect a communication from the peripheral device 102. At block 308, the controller 110 may determine that a unique identifier is present in the detected communication. The presence of the unique identifier may trigger the controller 110 to relay the communication to the host device 106 for processing. Accordingly, at block 310, the controller 110 may communicate a command or request to the host device 106 to resume a power-on state to process the received communication.

Figure 4:
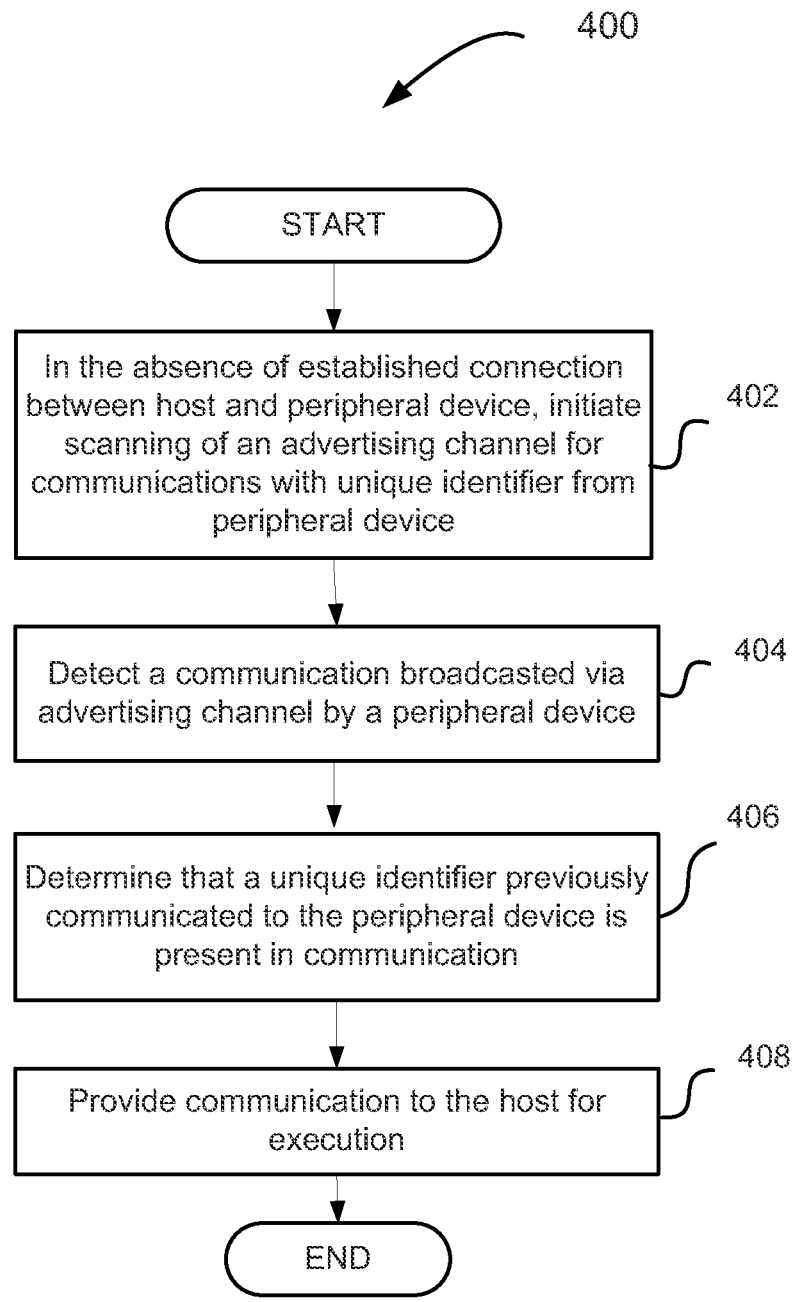
FIG. 4 is a process flow diagram illustrating yet another process for communications between a peripheral device and a host device in the absence of established connection between the devices, in accordance with some embodiments.

FIG. 4 is a process flow diagram illustrating another process 400 for communications between a peripheral device and a host device in the absence of established connection between the devices, in accordance with some embodiments. The process 200 may be performed, for example, by the controller 110 of the computer system 100, described in reference to FIG. 1.

The process 400 may begin at block 402, where the controller 110 may, in the absence of established connection between host and peripheral device, initiate a scanning of an advertising channel for communications with unique identifier from peripheral device 102. At block 404, the controller 110 may detect a communication broadcasted via advertising channel by the peripheral device 102. At block 406, the controller 110 may determine that a unique identifier previously communicated to the peripheral device is present in communication. The unique identifier may signal that the communication includes user input information. The presence of the unique identifier may trigger the controller 110 to relay the communication to the host device 106 for processing, e.g., execution. Accordingly, at block 408, the controller 110 may provide communication to the host device 106 for processing and/or execution.

Figure 5:
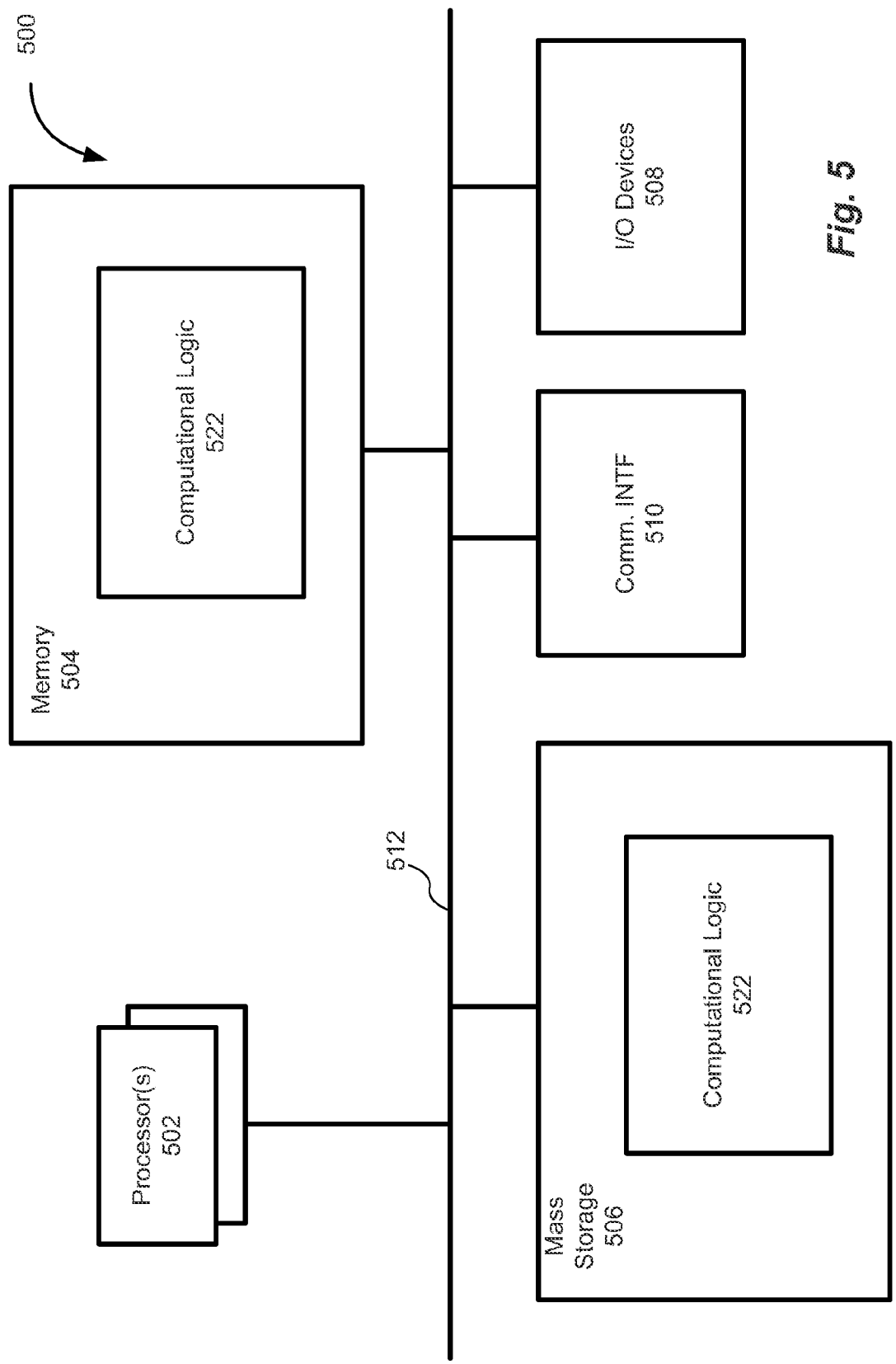
FIG. 5 illustrates an example computing environment suitable for practicing various aspects of the disclosure, in accordance with various embodiments.

Referring now to FIG. 5, an example computer suitable for use for various components of FIG. 1, such as peripheral device 102 or host device 106, is illustrated in accordance with various embodiments. As shown, computer 500 may include one or more processors or processor cores 502, and system memory 504. For the purpose of this application, including the claims, the terms "processor" and "processor cores" may be considered synonymous, unless the context clearly requires otherwise. Additionally, computer 500 may include mass storage devices 506 (such as diskette, hard drive, compact disc read only memory (CD-ROM) and so forth), input/output devices 508 (such as display, keyboard, cursor control, remote control, gaming controller, image capture device, and so forth) and communication interfaces 510 (such as network interface cards, modems, infrared receivers, radio receivers (e.g., Bluetooth), and so forth). The elements may be coupled to each other via system bus 512, which may represent one or more buses. In the case of multiple buses, they may be bridged by one or more bus bridges (not shown).

Each of these elements may perform its conventional functions known in the art. In particular, system memory 504 and mass storage devices 506 may be employed to store a working copy and a permanent copy of the programming instructions implementing the operations associated with devices 102, 110, 106, e.g., operations shown in FIGS. 2, 3, 4. The various elements may be implemented by assembler instructions supported by processor(s) 502 or high-level languages that may be compiled into such instructions.

The permanent copy of the programming instructions may be placed into permanent storage devices 506 in the factory, or in the field, through, for example, a distribution medium (not shown), such as a compact disc (CD), or through communication interface 510 (from a distribution server (not shown)). That is, one or more distribution media having an implementation of the agent program may be employed to distribute the agent and program various computing devices.

The number, capability and/or capacity of these elements 510-512 may vary, depending on whether computer 500 is used a host device 106 hosting the controller 110 of peripheral device 102, as well as whether computer 500 is a stationary computing device, such as a set-top box or desktop computer, or a mobile computing device such as a tablet computing device, laptop computer, game console, or smartphone. Their constitutions are otherwise known, and accordingly will not be further described.

Figure 6:
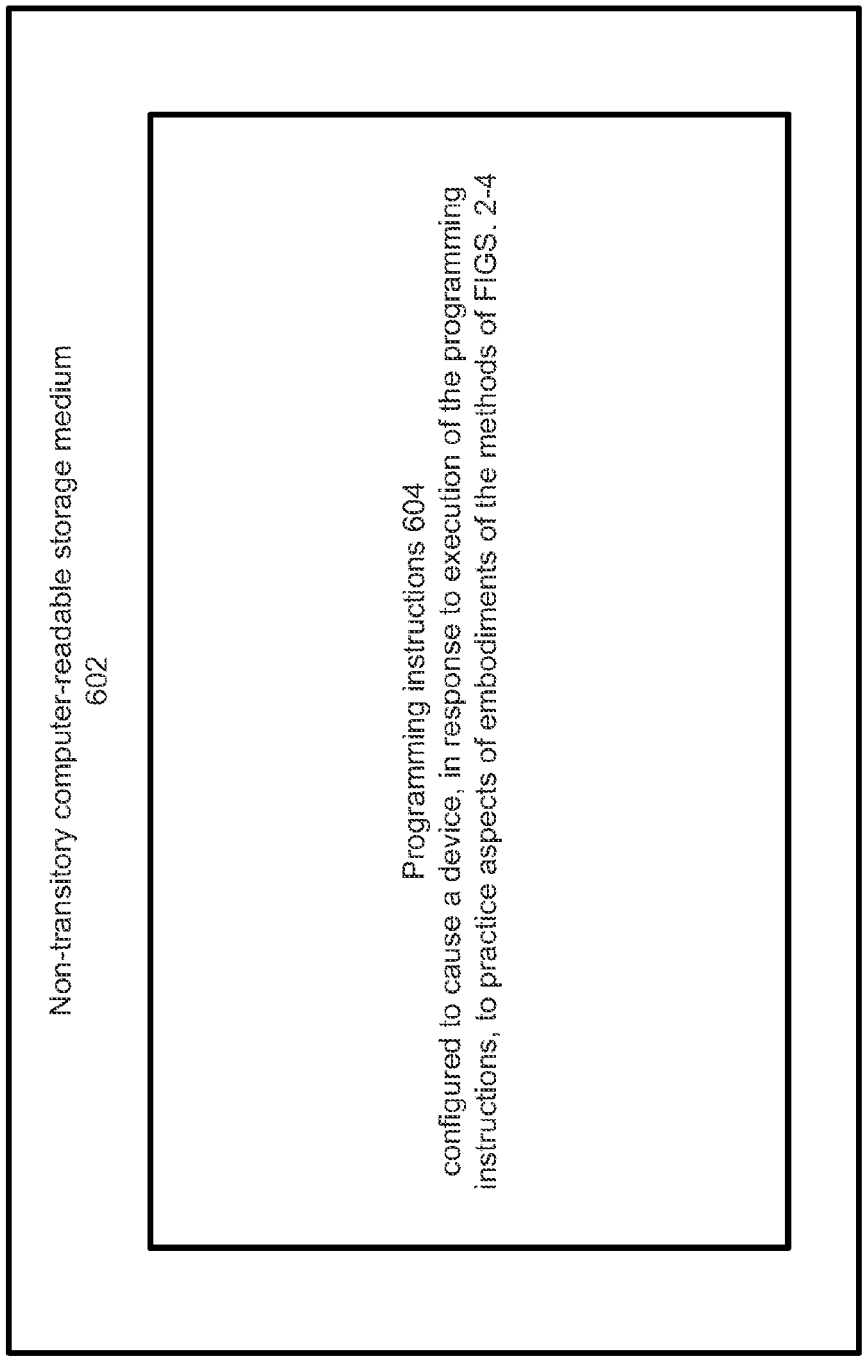
FIG. 6 illustrates an example storage medium with instructions configured to enable an apparatus to practice various aspects of the present disclosure, in accordance with various embodiments.

FIG. 6 illustrates an example non-transitory computer-readable storage medium 602 having instructions configured to practice all or selected ones of the operations associated with peripheral device 102, host device 106, and controller 110, earlier described, in accordance with various embodiments. As illustrated, non-transitory computer-readable storage medium 602 may include a number of programming instructions 604. Programming instructions 604 may be configured to enable a device, e.g., computer 500, in response to execution of the programming instructions, to perform, e.g., various operations of processes 200, 300, 400 of FIGS. 2, 3, 4, e.g., but not limited to, to the various operations performed. In alternate embodiments, programming instructions 604 may be disposed on multiple non-transitory computer-readable storage media 602 instead.

Referring back to FIG. 5, for one embodiment, at least one of processors 402 may be packaged together with computational logic 522 configured to practice aspects of processes 200, 300, 400 of FIGS. 2, 3, 4. For one embodiment, at least one of processors 502 may be packaged together with computational logic 522 configured to practice aspects of processes 200, 300, 400 of FIGS. 2, 3, 4, to form a System in Package (SiP). For one embodiment, at least one of processors 502 may be integrated on the same die with computational logic 422 configured to practice aspects of processes 200, 300, 400 of FIGS. 2, 3, 4. For one embodiment, at least one of processors 502 may be packaged together with computational logic 522 configured to practice aspects of processes 200, 300, 400 of FIGS. 2, 3, 4, to form a System on Chip (SoC). For at least one embodiment, the SoC may be utilized in, e.g., but not limited to, a mobile computing device such as a computing tablet or smartphone.

The following paragraphs describe examples of various embodiments. Example 1 is least one non-transitory computer-readable medium comprising executable instructions for facilitating communications that, in response to execution of the instructions by a computing device, enable the computing device to provide a communications controller to: initiate a scan of an advertising channel for communications initiated by a peripheral device external to the computing device, in response to the computing device entering a power-saving state or a power-off state; detect for a communication broadcasted via the advertising channel by the peripheral device; determine whether a unique identifier previously provided to the peripheral device is present in a detected communication; and communicate a command to cause the computing device to resume a power-on state, based on a result of the determination, wherein the computing device is configured to communicate with the peripheral device via a connection established over at least one of a plurality of communication channels while the computing device is not in the power-saving or power-off state, wherein the advertising channel and the communication channels are different channels.

Example 2 may include the subject matter of Example 1, and further specifies that the computing device is configured to de-establish the connection between the computing device and the peripheral device over the at least one of the plurality of the communication channels when the computing device is in the power-saving or power-off state.

Example 3 may include the subject matter of Example 1, and further specifies that the communications controller is to further provide the unique identifier to the peripheral device prior to the computing device entering the power-saving or power-off state.

Example 4 may include the subject matter of any of Example 1 to 3, and further specifies that the computing device comprises one of a set-top box, a media player, a game console, or a tablet computer.

Example 5 is at least one non-transitory computer-readable medium comprising executable instructions for facilitating communications that, in response to execution of the instructions by a computing device, enable the computing device to provide a communications controller to: detect for a communication broadcasted via an advertising channel by a peripheral device external to the computing device; determine whether a unique identifier previously communicated to the peripheral device is present in a detected communication; and provide the detected communication for processing by another component of the computing device, based on a result of the determination, wherein the computing device is configured to communicate with the peripheral device via a connection established over at least one of a plurality of communication channels, wherein the advertising channel and the plurality of communication channels are different channels, and wherein the connection between the computing and peripheral devices is de-established when the communication is broadcasted via the advertising channel.

Example 6 may include the subject matter of Example 5, and further specifies that the executable instructions, in response to execution of by computer device, further enable the computing device to communicate with the peripheral device via the established connection according to a communication protocol supported by both the computing device and the peripheral device.

Example 7 may include the subject matter of Example 6, and further specifies that the communication protocol comprises a Bluetooth® Low Energy (BLE) communication protocol.

Example 8 may include the subject matter of Example 6, and further specifies that the communications controller to further initiate a scan of the advertising channel for the communications initiated by the peripheral device when the connection between the computing device and the peripheral device is de-established.

Example 9 may include the subject matter of any of Examples 5 to 8, and further specifies that the peripheral device includes a remote control.

Example 10 is an for facilitating communications comprising: a host processor; and a communications controller operated by the host processor to: detect a communication broadcasted via an advertising channel by a peripheral device external to the apparatus; determine whether a unique identifier previously communicated to the peripheral device is present in the detected communication; and output a message corresponding to the communication for processing, based on a result of the determination, wherein the apparatus is to communicate with the peripheral device via a connection established over at least one of a plurality of communication channels, wherein the advertising channel and the communication channels are different channels, and wherein the connection between the apparatus and the peripheral is de-established when the communication is broadcasted via the advertising channel.

Example 11 may include the subject matter of Example 10, and further specifies that the apparatus is configured to communicate with the peripheral device via the established connection according to a communication protocol supported by both the apparatus and the peripheral device.

Example 12 may include the subject matter of Example 11, and further specifies that the communication protocol comprises a Bluetooth® Low Energy (BLE) communication protocol.

Example 13 may include the subject matter of Example 10, and further specifies that the communications controller is further operated by the host processor to initiate a scan of the advertising channel for communications initiated by the peripheral device when the connection between the apparatus and the peripheral device is de-established, to detect the communication broadcasting over the advertising channel.

Example 14 may include the subject matter of Example 10, and further specifies that the message corresponding to the communication comprises a command to the host processor to resume a power-on state.

Example 15 may include the subject matter of any of Examples 10 to 14, and further specifies that the message corresponding to the communication comprises event information about an event associated with the peripheral device.

Example 16 is computer-implemented method for facilitating communications, comprising: detecting, by a communications controller associated with a computing device, for a communication broadcasted via an advertising channel by a peripheral device external to the computing device; determining, by the communications controller whether a unique identifier previously communicated to the peripheral device is present in a detected communication; and providing, by the communications controller, a message corresponding to the communication, for processing, based on a result of the determination, wherein the computing device is configured to communicate with the peripheral device via a connection established over at least one of a plurality of communication channels, wherein the advertising channel and the communication channels are different channels, and wherein the connection between the devices is de-established when the communication is broadcasted via the advertising channel.

Example 17 may include the subject matter of Example 16, and further specifies that the method further comprises: initiating, by the communications controller, a scan of the advertising channel for communications initiated by the peripheral device, in response to receiving an indication that the computing device entered a power-saving or power-off state, wherein the message corresponding to the detected communication comprises a command to the computing device to resume a power-on state.

Example 18 may include the subject matter of any of Examples 16 to 17, and further specifies that the method further comprises: initiating, by the communications controller, a scan of the advertising channel for the communications initiated by the peripheral device, wherein the communication includes data about an event associated with the peripheral device.

Example 19 is an apparatus for facilitating communications, comprising: means for detecting for a communication broadcasted via an advertising channel by a peripheral device external to the apparatus; means for determining whether a unique identifier previously communicated to the peripheral device is present in a detected communication; and means for providing a message corresponding to the communication, for processing, based on a result of the determination, wherein the apparatus is configured to communicate with the host device via the connection established over at least one of a plurality of communication channels allocated for the connection, wherein the advertising channel is not included in the communication channels.

Example 20 may include the subject matter of Example 19, and further specifies that the apparatus further comprises: means for initiating a scan of the advertising channel for communications initiated by the peripheral device, to detect the communication broadcasted via the advertising channel by the peripheral device.

Example 21 is an apparatus for facilitating communications, comprising: a processor; and logic operated by the processor to: detect user input on a user interface of the apparatus; determine that a connection with a host device is not established; insert a unique identifier, previously provided to the apparatus, in a communication including information about the user input, based on a result of the determination; and broadcast the communication to the host device over an advertising channel, wherein the apparatus is configured to communicate with the host device via a connection established over at least one of a plurality of communication channels, wherein the advertising channel and the plurality of communication channels are different channels.

Example 22 may include the subject matter of Example 21, and further specifies that the apparatus is configured to communicate with the host device via the established connection according to a communication protocol, the communication protocol including a Bluetooth® Low Energy (BLE) communication protocol.

Example 23 may include the subject matter of Example 21, and further specifies that the apparatus includes a remote control for controlling the host device.

Example 24 may include the subject matter of Example 21, and further specifies that the host device comprises one of a set-top box, a media player, a game console, or a tablet computer.

Example 25 is an apparatus for facilitating communications, comprising: means for initiating a scan of an advertising channel for communications initiated by a peripheral device external to the apparatus, in response to the apparatus entering a power-saving state or a power-off state; means for detecting for a communication broadcasted via the advertising channel by the peripheral device; means for determining whether a unique identifier previously provided to the peripheral device is present in a detected communication; and means for communicating a command to cause the apparatus to resume a power-on state, based on a result of the determination, wherein the apparatus is configured to communicate with the peripheral device via a connection established over at least one of a plurality of communication channels while the apparatus is not in the power-saving or power-off state, wherein the advertising channel and the communication channels are different channels.

Example 26 may include the subject matter of Example 25, and further specifies that the apparatus further comprises: means for de-establishing the connection between the apparatus and the peripheral device over the at least one of the plurality of communication channels when the apparatus is in the power-saving or power-off state.

Example 27 is an apparatus for facilitating communications, comprising: means for detecting for a communication broadcasted via an advertising channel by a peripheral device external to the apparatus; means for determining whether a unique identifier previously communicated to the peripheral device is present in a detected communication; and means for providing the detected communication for processing by another component of the apparatus, based on a result of the determination, wherein the apparatus is configured to communicate with the peripheral device via a connection established over at least one of a plurality of communication channels, wherein the advertising channel and the plurality of communication channels are different channels, and wherein the connection between the computing and peripheral devices is de-established when the communication is broadcasted via the advertising channel.

Example 28 may include the subject matter of Example 27, and further specifies that the apparatus further comprises: means for enabling the apparatus to communicate with the peripheral device via the established connection according to a communication protocol supported by both the apparatus and the peripheral device.

Computer-readable media (including non-transitory computer-readable media), methods, apparatuses, systems and devices for performing the above-described techniques are illustrative examples of embodiments disclosed herein. Additionally, other devices in the above-described interactions may be configured to perform various disclosed techniques.

Although certain embodiments have been illustrated and described herein for purposes of description, a wide variety of alternate and/or equivalent embodiments or implementations calculated to achieve the same purposes may be substituted for the embodiments shown and described without departing from the scope of the present disclosure. This application is intended to cover any adaptations or variations of the embodiments discussed herein. Therefore, it is manifestly intended that embodiments described herein be limited only by the claims.

Where the disclosure recites "a" or "a first" element or the equivalent thereof, such disclosure includes one or more such elements, neither requiring nor excluding two or more such elements. Further, ordinal indicators (e.g., first, second or third) for identified elements are used to distinguish between the elements, and do not indicate or imply a required or limited number of such elements, nor do they indicate a particular position or order of such elements unless otherwise specifically stated.

What is claimed is:

1. At least one non-transitory computer-readable medium comprising executable instructions that, in response to execution of the instructions by a computing device, enable the computing device to provide a communications controller to:
   receive an indication of the computing device entering a power-off state;
   initiate a scan of an advertising channel for communications initiated by a peripheral device external to the computing device, in response to the computing device entering the power-off state, wherein the advertising channel is to communicate information related to a peripheral device identification;
   detect a communication broadcasted via the advertising channel by the peripheral device, wherein a connection between the computing device and the peripheral device over at least one of a plurality of communication channels is de-established during the communication of the peripheral device identification information via the advertising channel;

determine whether a unique identifier previously provided to the peripheral device is present in a detected communication; and communicate a command to cause the computing device to resume a power-on state, based on a result of the determination, to enable a connection with the peripheral device over the at least one of a plurality of communication channels over a low energy wireless communication network, wherein the computing device is to communicate with the peripheral device via the connection established over the at least one of the plurality of communication channels while the computing device is not in the power-off state, wherein the advertising channel and the communication channels are different channels, wherein the peripheral device is to transmit communications to the computing device over the established connection according to a communication protocol associated with the low energy wireless communication network.

2. The non-transitory computer-readable medium of claim 1, wherein the computing device is to de-establish the connection between the computing device and the peripheral device over the at least one of the plurality of the communication channels when the computing device is in the power-off state.

3. The non-transitory computer-readable medium of claim 1, wherein the communications controller is to further provide the unique identifier to the peripheral device prior to the computing device entering the power-off state.

4. The non-transitory computer-readable medium of claim 1, wherein the computing device comprises one of a set-top box, a media player, a game console, or a tablet computer.

5. At least one non-transitory computer-readable medium comprising executable instructions that, in response to execution of the instructions by a computing device, enable the computing device to provide a communications controller to:

receive an indication of the computing device entering a power-off state;

detect for a communication broadcasted via an advertising channel by a peripheral device external to the computing device, wherein the advertising channel is to communicate information related to a peripheral device identification;

determine whether a unique identifier previously communicated to the peripheral device is present in a detected communication; and provide the detected communication for processing by another component of the computing device, based on a result of the determination, wherein the computing device is to communicate with the peripheral device via a connection established over at least one of a plurality of communication channels over a low energy wireless communication network while the computing device is not in the power-off state, wherein the peripheral device is to transmit communications to the computing device over the established connection according to a communication protocol associated with the low energy wireless communication network, wherein the advertising channel and the plurality of communication channels are different channels, and wherein the connection between the computing device and peripheral device over the at least one of the plurality of communication channels is de-established when the communication is broadcasted via the advertising channel.

6. The non-transitory computer-readable medium of claim 5, wherein the communication protocol is supported by both the computing device and the peripheral device.

7. The non-transitory computer-readable medium of claim 6, wherein the communication protocol comprises a Bluetooth® Low Energy (BLE) communication protocol.

8. The non-transitory computer-readable medium of claim 6, wherein the communications controller is to further initiate a scan of the advertising channel for the communications initiated by the peripheral device when the connection between the computing device and the peripheral device is de-established.

9. The non-transitory computer-readable medium of claim 5, wherein the peripheral device includes a remote control.

10. An apparatus comprising:

a host processor; and a communications controller operated by the host processor to:

receive an indication of the apparatus entering a power-off state;

detect a communication broadcasted via an advertising channel by a peripheral device external to the apparatus, wherein the advertising channel is to communicate information related to a peripheral device identification;

determine whether a unique identifier previously communicated to the peripheral device is present in the detected communication; and output a message corresponding to the communication for processing, based on a result of the determination, wherein the apparatus is to communicate with the peripheral device via a connection established over at least one of a plurality of communication channels over a low energy wireless communication network while the apparatus is not in the power-off state, wherein the peripheral device is to transmit communications to the apparatus over the established connection according to a communication protocol associated with the low energy wireless communication network, wherein the advertising channel and the communication channels are different channels, and wherein the connection between the apparatus and the peripheral device over the at least one of the plurality of communication channels is de-established when the communication is broadcasted via the advertising channel.

11. The apparatus of claim 10, wherein the communication protocol is supported by both the apparatus and the peripheral device.

12. The apparatus of claim 11, wherein the communication protocol comprises a Bluetooth® Low Energy (BLE) communication protocol.

13. The apparatus of claim 10, wherein the communications controller is further operated by the host processor to initiate a scan of the advertising channel for communications initiated by the peripheral device when the connection between the apparatus and the peripheral device is de-established, to detect the communication broadcasting over the advertising channel.

14. The apparatus of claim 10, wherein the message corresponding to the communication comprises a command to the host processor to resume a power-on state.

15. The apparatus of claim 10, wherein the message corresponding to the communication comprises event information about an event associated with the peripheral device.

16. A computer-implemented method comprising:
- receiving, by a communications controller associated with a computing device, an indication of the computing device entering a power-off state;
- detecting, by the communications controller, for a communication broadcasted via an advertising channel by a peripheral device external to the computing device, wherein the advertising channel is to communicate information related to a peripheral device identification;
- determining, by the communications controller whether a unique identifier previously communicated to the peripheral device is present in a detected communication; and
- providing, by the communications controller, a message corresponding to the communication, for processing, based on a result of the determination,
- wherein the computing device is to communicate with the peripheral device via a connection established over at least one of a plurality of communication channels over a low energy wireless communication network while the computing device is not in the power-off state, wherein the peripheral device is to transmit communications to the computing device over the established connection according to a communication protocol associated with the low energy wireless communication network, wherein the advertising channel and the communication channels are different channels, and wherein the connection between the devices over the at least one of the plurality of communication channels is de-established when the communication is broadcasted via the advertising channel.

17. The computer-implemented method of claim 16, further comprising:
- initiating, by the communications controller, a scan of the advertising channel for communications initiated by the peripheral device, in response to receiving the indication that the computing device entered the power-off state, wherein the message corresponding to the detected communication comprises a command to the computing device to resume a power-on state.

18. The computer-implemented method of claim 16, further comprising:
- initiating, by the communications controller, a scan of the advertising channel for the communications initiated by the peripheral device, wherein the communication includes data about an event associated with the peripheral device.

19. An apparatus, comprising:
- means for receiving an indication of the apparatus entering a power-off state;
- means for detecting for a communication broadcasted via an advertising channel by a peripheral device external to the apparatus, wherein the advertising channel is to communicate information related to a peripheral device identification;
- means for determining whether a unique identifier previously communicated to the peripheral device is present in a detected communication; and
- means for providing a message corresponding to the communication, for processing, based on a result of the determination,
- wherein the apparatus is to communicate with the peripheral device via a connection established over at least one of a plurality of communication channels allocated for the connection over a low energy wireless communication network while the apparatus is not in the power-off state, wherein the peripheral device is to transmit communications to the apparatus over the established connection according to a communication protocol associated with the low energy wireless communication network, wherein the advertising channel is not included in the communication channels, and wherein apparatus further comprises means for de-establishing the connection between the apparatus and the peripheral device over the at least one of the plurality of communication channels when the communication is broadcasted via the advertising channel.

20. The apparatus of claim 19, further comprising:
- means for initiating a scan of the advertising channel for communications initiated by the peripheral device, to detect the communication broadcasted via the advertising channel by the peripheral device.

21. An apparatus, comprising:
- a processor; and
  - logic operated by the processor to:
  - detect user input on a user interface of the apparatus;
  - determine that a connection with a host device over at least one of a plurality of communication channels is not established, wherein the host device is in a power-off state;
  - insert a unique identifier, previously provided to the apparatus, in a communication including information about the user input, based on a result of the determination; and
  - broadcast the communication to the host device over an advertising channel, wherein the advertising channel is to communicate information related to a peripheral device identification, wherein a connection between the apparatus and the host device over at least one of a plurality of communication channels is de-established during the communication of the peripheral device identification information via the advertising channel,
  - wherein the apparatus is to communicate with the host device via the connection established over the at least one of the plurality of communication channels over an established connection over a low energy wireless communication network according to a communication protocol associated with the low energy wireless communication network, while the host device is not in the power-off state, wherein the advertising channel and the plurality of communication channels are different channels.

22. The apparatus of claim 21, wherein the apparatus is to communicate with the host device via the connection established according to the communication protocol including a Bluetooth® Low Energy (BLE) communication protocol.

23. The apparatus of claim 21, wherein the apparatus includes a remote control for controlling the host device.

* * * * *